United States Patent [19]
Fletcher et al.

[11] 3,827,288
[45] Aug. 6, 1974

[54] DIGITAL SERVO CONTROL OF RANDOM SOUND TEST EXCITATION

[76] Inventors: James C. Fletcher, Administrator of the National Aeronautics and Space Administration with respect to an invention of; Robert B. Nakich, Glendale, Calif.

[22] Filed: Mar. 16, 1972

[21] Appl. No.: 235,338

[52] U.S. Cl.................. 73/69, 73/71.5 R, 181/.5 R
[51] Int. Cl. .......................................... G01n 29/00
[58] Field of Search..................... 73/67, 69, 71.5 R; 181/.5 R, .5 NP, .5 AP; 324/77 B, 77 E

[56] References Cited
UNITED STATES PATENTS

| | | | |
|---|---|---|---|
| 3,015,949 | 1/1962 | Arnold | 73/71.5 |
| 3,104,543 | 9/1963 | Kaminski | 73/69 |
| 3,440,350 | 4/1969 | Flanagan | 179/1 FS |
| 3,698,241 | 10/1972 | Bouclin | 73/69 |

OTHER PUBLICATIONS

R. S. Mukai, Digital Instrumentation for Acoustic Testing, Proceedings of the 24 Annual ISA Conference, Houston, Tex., Oct. 1969, SO167 00 28.
R. Boynton, A spectrum Equalizer For Acoustic Noise Testing, MB Vibration Notebook, Feb. 1961, Vol. 7, No. 1, 73–69.

*Primary Examiner*—Richard C. Queisser
*Assistant Examiner*—John P. Beauchamp
*Attorney, Agent, or Firm*—Monte F. Mott; Paul F. McCaul; John R. Manning

[57] ABSTRACT

A digital servo control system for random noise excitation of a test object in a reverberant acoustic chamber employs a plurality of sensors spaced in the sound field to produce signals in separate channels which are decorrelated and averaged. The average signal is divided into a plurality of adjacent frequency bands cyclically sampled by a time division multiplex system, converted into digital form, and compared to a predetermined spectrum value stored in digital form. The result of the comparisons are used to control a time-shared up-down counter to develop gain control signals for the respective frequency bands in the spectrum of random sound energy picked up by the microphones.

10 Claims, 4 Drawing Figures

| | | |
|---|---|---|
| 1 | ‾‾‾|___ | SELECT SWITCH 22 |
| 2 | _∏___ | A/D CONVERT COMMAND RESET UP/DOWN COUNTER |
| 3 | __∏__ | SELECT SET POINT REG. PRESET UP/DOWN COUNTER FROM HOLD REGISTER |
| 4 | ___∏_ | CLOCK UP/DOWN COUNTER |
| 5 | ____∏ | STORE UP/DOWN COUNTER IN HOLD REGISTER |

SINGLE FRAME MULTIPLEX TIMING

FIG. 3

DIGITAL SERVO CONTROL OF RANDOM SOUND TEST EXCITATION

ORIGIN OF THE INVENTION

The invention described herein was made in the performance of work under a NASA contract and is subject to the provisions of section 305 of the National Aeronautics and Space Act of 1958, Public Law 85-568 (72 Stat. 435; USC 2457).

BACKGROUND OF THE INVENTION

This invention relates to the control of random noise excitation of a test object in a reverberant acoustic chamber, and more particularly to a method and apparatus for direct digital control of such random noise excitation.

Random noise excitation of a test object in a reverberant acoustic chamber is desirable for such purposes as conducting qualification testing of spacecraft, or spacecraft components, and other objects. The test object is subjected to a high energy sound field produced in the chamber by a powerful electropneumatic sound generator using one or more transducers in accordance with a sound energy spectrum prescribed by a test specification. Because of the reverberant nature of the acoustic chamber, the sound field around the test object will vary in intensity as a function of both position in the acoustic chamber, space and frequency. It is therefore necessary to dispose a number of sensors (microphones) at different positions in the sound chamber to determine the actual sound intensities to which the test object is being subjected.

By monitoring the output of each sensor, it is possible to determine whether the test specification is being met. To accomplish this, it is necessary to obtain the average value of the sensor signals, i.e., of the sound field at different points, but because the random noise excitation emanates from a single source, the signals from the sensors are essentially coherent, and it is statistically impossible to obtain a true average of the sensor signals. This is because there is unacceptable phase cancellation errors between coherent signals when the data is averaged for analysis.

To permit averaging, the signals from the sensors are first decorrelated by effectively delaying each signal by a different predetermined amount before summing, using an operational amplifier having a feedback resistor selected to effect a division by the number of sensor signals being summed. Decorrelation may be done by using digital techniques for time multiplex sampling the sensor signals, converting them from analog to digital form, and storing each sampled value in a delay (shift) register of different length. The outputs of the registers could then be averaged digitally, i.e., added and the sum divided by the number of independent signals but are preferably averaged in an analog domain. Adding decorrelated signals is permissable since the signals are statistically independent.

Once the sensor signals have been decorrelated and averaged, the average signal may be analyzed in a conventional audio spectrum analyzer, such as a BK Model 2112 Spectrum Analyzer. RMS filters in the spectrum analyzer perform a root mean square average of the incoming statistically independent signals, splitting the sound energy spectrum into narrow band segments to allow direct digital processing of each segment independently. However, such an audio spectrum analyzer will only permit a record to be made of the random noise excitation of the test object to determine the extent to which the specification has been met, and not to control the random noise spectrum to assure that the random noise spectrum of the test specification has been met.

To achieve closed loop spectrum control, previous attempts have employed analog techniques, but such attempts have been ineffective because in a high energy reverberant test chamber there is an appreciable delay in energy build up and decay. This delay does not permit use of a closed (instantaneous servo) loop arrangement to effect control because the signal to be controlled is indeterminate during build up and decay. Under those conditions an instantaneous servo loop would oscillate, and never stabilize the servo error signal.

SUMMARY OF THE INVENTION

In accordance with the present invention, control of random sound energy in a reverberant acoustic chamber is obtained by operating on signals from acoustic sensors for gain control in discrete frequency bands of a random noise signal applied to a transducer. The sensor signals are averaged, and the average signal is then separated into a plurality of narrow band segments through a bank of filters. These narrow band signals cover the entire spectrum of interest. Each of these signals is averaged, cyclically sampled in sequence, and converted to digital form for comparison with a desired level of a test spectrum stored in digital form. Any difference in each band is employed to generate for that band a gain control control which will tend to drive the same band signal sampled during the next cycle to the desired level with a maximum of one unit change per sampling cycle, thus introducing a lag in the feedback control to avoid oscillations in the closed loop random noise control system. To accomplish the selective band control of a random noise signal applied to a single transducer, the random noise produced by a generator is separated into the same number of equal ⅓ octave bands as the average of the sensor signals. The feedback control for the different bands is then applied on the separated noise signals. The separately controlled frequency band signals are then combined and applied to the sound transducer in the reverberant acoustic chamber.

The novel features that are considered characteristic of this invention are set forth with particularity in the appended claims. The invention will best be understood from the following description when read in connection with the accompanying drawings.

DESCRIPTION OF THE PREFERRED EMBODIMENTS

Figure 1:
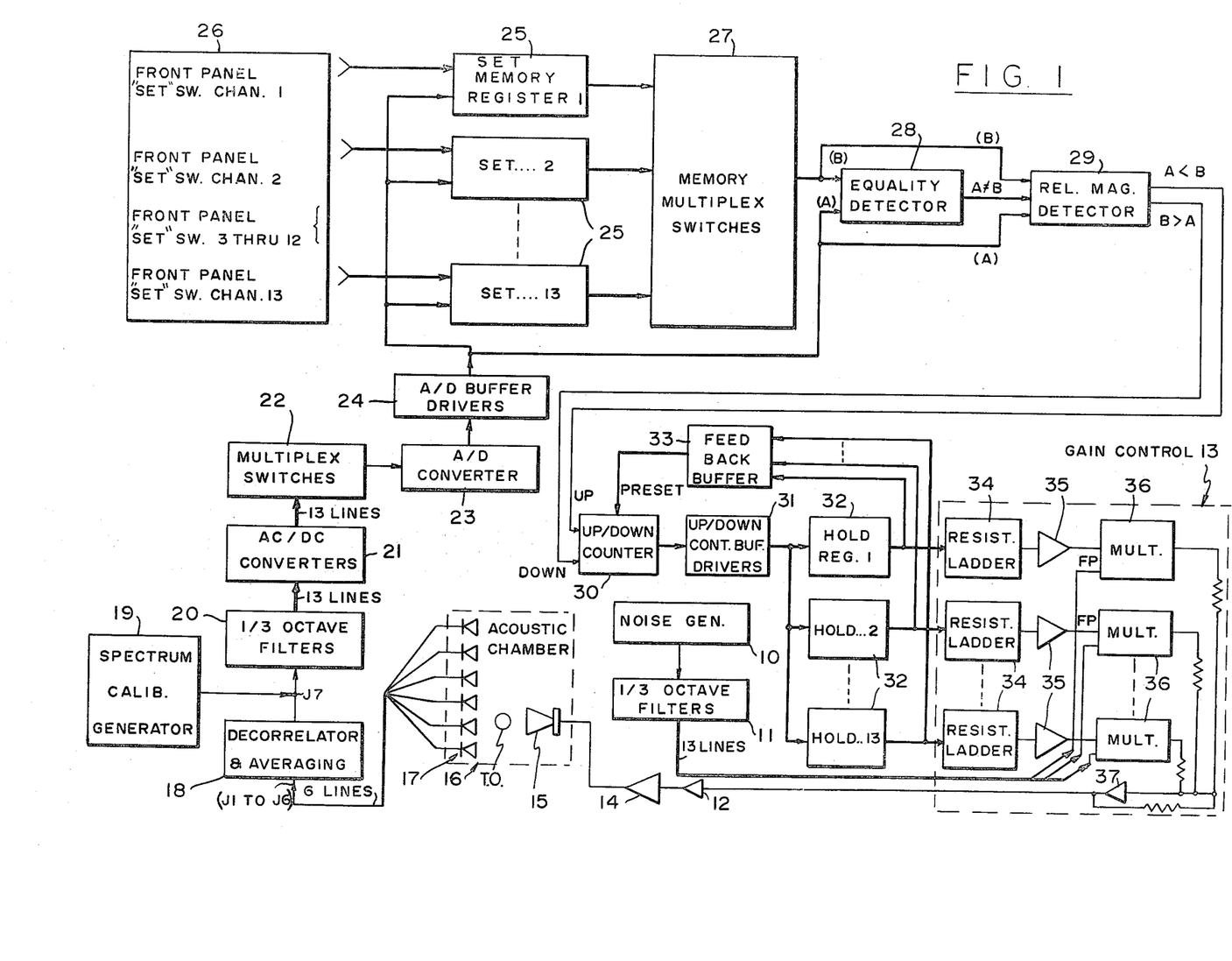
FIG. 1 illustrates a digital servo control arrangement for random noise excitation of a test object in a reverberant acoustic chamber in a preferred embodiment using multiplex techniques to time share an analog-to-digital converter, equality and relative magnitude detectors, and an up-down counter.

Referring to FIG. 1 of the drawings, an exemplary acoustic test system embodying the present invention is shown in block diagram form. A white noise signal from random noise generator 10 is applied through a bank of thirteen ⅓ octave filters 11 to a preamplifier 12 via a gain control section 13. The preamplifier 12 drives a power amplifier 14 which in turn drives a powerful electropneumatic sound generator (transducer) 15.

Qualification testing of a test object T.O., such as a spacecraft, often includes subjecting the object to high intensity acoustical energy. Such testing involves simulation of a random sound environment under controlled conditions of frequency, duration and amplitude according to a desired frequency spectrum set forth in a test specification. Such simulation is difficult to obtain since the sound energy levels which must be generated are very high (150 db relative to 0.0002 microbar).

In order to generate a high intensity difused random sound field at reasonable cost, it is necessary to contain the energy within a specially reverberant acoustic test chamber 16. Furthermore to comply with test specifications, it is necessary to monitor the sound field produced within the acoustic test chamber through a plurality of test sensors (microphones) 17. Because the closed chamber has walls, a floor and a ceiling, acoustical energy introduced therein is subjected to reflections in a pattern which produces sound maxima and minima, (standing waves or nodes) which are nonuniformly distributed within the excited volume. This nonuniformity is primarily a function of two factors: frequency and position. At low frequencies, minima are deep and spread apart. As frequency increases, minima move closer together. In addition, the sound field for any particular frequency is very different for any two points within the chamber. It is evident that a monitoring signal taken from a single position in the chamber will produce energy level indications due to positional variations in the sound pressure level at any particular point.

Ideally, a very large number of monitoring sensors spatially distributed within the chamber would be used in order to provide a means for averaging the sound field to eliminate the spatial variation problem. However, it is more economical to use a limited number of sensors, for example six, strategically positioned about the test object for monitoring the sound field. The signals from the sensors are then averaged in order to determine whether the generated sound field complies with the test specification. However, simple ac averaging techniques cannot be used because such techniques introduce extremely large unacceptable phase concellation errors when coherent random data is analyzed. Here the random noise picked up by the sensor emanates from a single source. Consequently, the signals from the sensors 17 are coherent random signals. Coherency within the sound field not only varies with frequency, but also varies in accordance with the distance between the microphones, becoming greater as the frequency bandwidth approaches unity and as the spacing between microphones is reduced.

A decorrelator and averaging unit 18 make the signals from the sensors 17 statistically independent by delaying the signal from each sensor differently so that there can be no reaction between common frequencies. Once that is done, the signals can be averaged directly without introducing unacceptable phase cancellation errors. Briefly, the decorrelator and averaging unit 18 is comprised of a first section which delays each of the sensor signals in successive channels 1 through 6 by a period of 38.4 milliseconds, and a second section which adds and divides by 6 the delayed (noncoherent) sensor signals.

Decorrelation could also be accomplished by microphone spacings, but where the test specification imposes a basic restriction such that the confines of the chamber prevent the sensors from being spaced sufficiently apart, this technique of decorrelating the signals with delay lines must be employed, particularly at low frequencies where these restrictions become especially important. For example, at 400 Hz., a 10 foot spacing between sensors would suffice, but at 100 Hz., a 38 foot spacing would be required. If the acoustic chamber were to be made large enough for that spacing, a larger electropeumatic transducer would be required.

Since it is virtually impossible to achieve the necessary statistical independence of sensor channel information by means of spacing, the alternative is to delay the signals in time to effect the desired decorrelation, as just described. That has an effect equivalent to moving the sensors apart. In its simplest form, such a decorrelator may employ analog delay lines in the first section and an analog adder in the second section. However, digital techniques are preferred in the decorrelator in order that the desired delay in each channel may be more reliably maintained.

Figure 2:
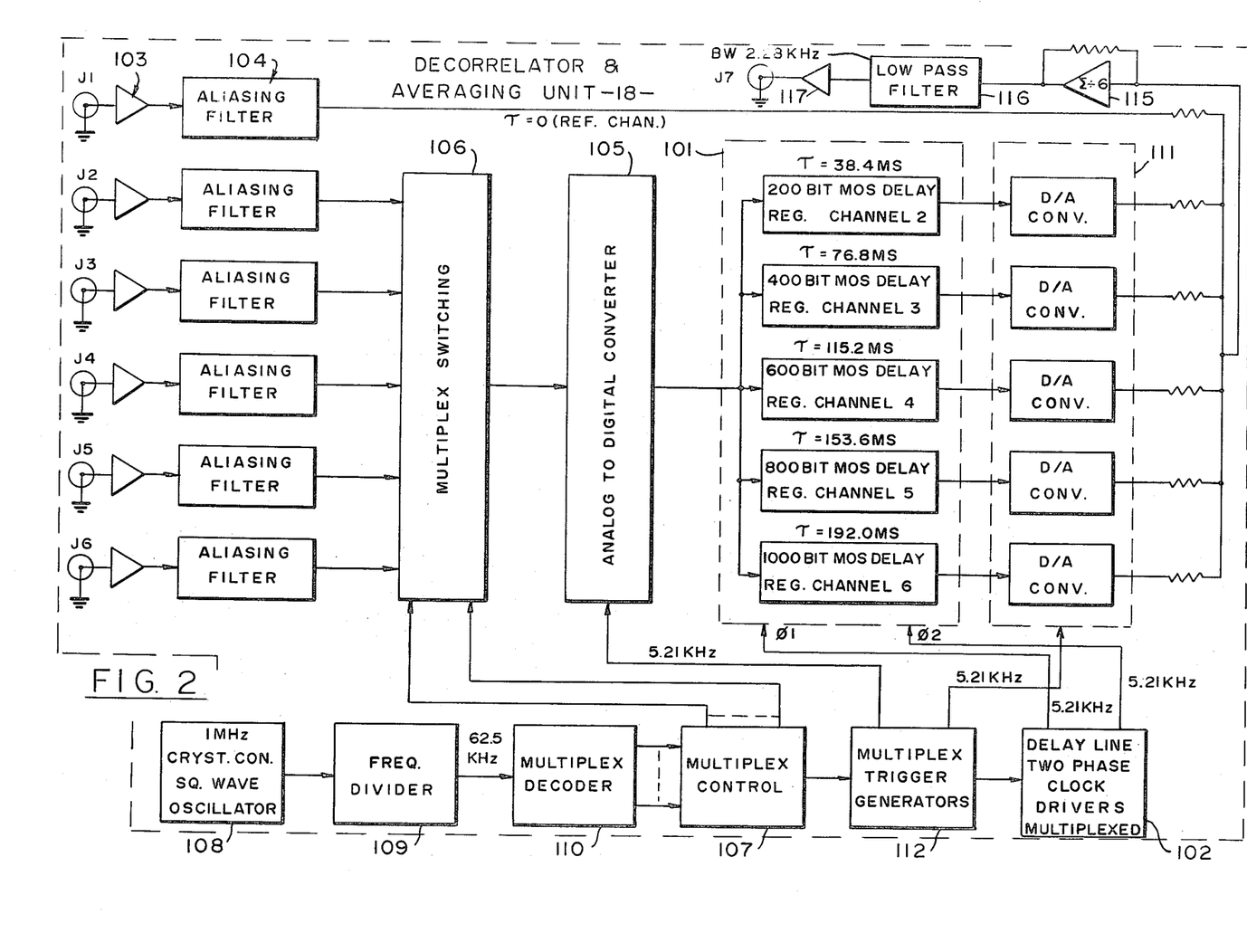
FIG. 2 illustrates a preferred embodiment of a decorrelation and averaging unit in the arrangement of FIG. 1, which unit employs multiplexing techniques for time sharing an analog-to-digital converter and digital techniques for effecting decorrelation by delaying time multiplexed signals by different equally spaced periods.

An exemplary digital decorrelator and averaging unit will now be described with reference to FIG. 2. The decorrelator is comprised of a six-channel digital delay system 101 utilizing dynamic MOS shift registers of different length in each channel, all clocked at a specific rate by pulses from a clock driver 102, the specific clock rate being selected in conjunction with the number of bits in the respective shift registers to separate the analog input signals at terminals J1 through J6 by 38.4 milliseconds.

No shift register is needed in the decorrelator 101 for channel 1, the first channel at terminal J1. The signal in that channel may be considered the reference signal. For channel 2, a 200 bit shift register clocked at the rate of 5.21 KHz separate the second channel from the first channel by the desired 38.4 milliseconds. The shift register for channel 3 is twice as long as for channel 2 while the shift registers for channels 4, 5 and 6 are 3, 4 and 5 times as long as the shift register for channel 2.

The electrical signals present at terminals J1 to J6 are fed through operational amplifiers 103 which serve as buffer amplifiers and also provide a convenient means for effecting level adjustment between individual channels for calibration purposes. The output of each operational amplifier is passed through a filter 104. Filters are needed in channels 2 through 6 because in order to effect decorrelation with digital delay lines, the signals are initially converted from analog to digital form in a converter 105 time shared through multiplexing switches 106. Sampling the analog signals in the channels 2 through 6 introduces the possibility of distortion in the form of "aliasing" which has the effect of "folding back" some of the sampled high frequency information. This produces an undesirable apparent increase in energy in the low frequency end of the spectrum. This aliasing problem is reduced by the filters 104 which attenuate unnecessary high frequency information, thereby preventing "folding back" of undesired energy. Although only channels 2 through 6 require filters for this purpose, a similar filter is used in channel 1, so that all channels have identical roll off bandwidth characteristics. These filters are eight pole Chebyshev devices which reject all frequencies above 2.28 KHz, with a sharp roll off greater than 58 db per octave. Maximum ripple in the pass band is less than ±0.25 db. Suitable anti-aliasing filters are commercially available.

It would be desirable to use a separate analog-to-digital converter in each channel for simplicity, but for purposes of economy, a single converter is used with multiplex switches 106 to direct the output of each of the channels 2 through 6 through the analog-to-digital converter in sequence during each sampling cycle. The switches are implemented with MOS field effect transistors in a straight-forward manner. Field-effect devices are selected because in the off (open) state, such devices have a very high input impedance which make them almost perfect switches.

Each of the channels 2 through 6 is individually multiplexed in correct time sequence by appropriate gating signals generated in a multiplex control unit 107. In order to select a channel at the clock rate of 5.21 KHz, a 1 MHz oscillator 108 drives a frequency divider 109 to produce a multiplexed clock of 62.5 KHz. That higher frequency clock drives a multiplex decoder 110 to actually make a different selection every 5.21 KHz and to repeatedly select the 5 channels in sequence.

When analog information from one channel is to be presented to the converter 105, the multiplex switch for that channel is commanded to close (turn on) by the multiplex control unit 107, thereby transferring analog information to the converter. All other channel switches are at that time open (off). When information from another channel is to be presented to the converter, similar gating pulses are developed commanding the analog-to-digital converter to transfer information to the input of the appropriate delay register while a new sample of analog data is received through the multiplex switches 106. This process is repeated until the information in all the channels has been converted into digital form. Since analog-to-digital conversion is effected in less than about four microseconds, and the highest acoustic frequency encountered is less than 5 KHz, it is not necessary to use sample and hold networks in the converter 105. A low cost converter of the 8-bit, bipolar type operating on analog signals within the range of ±5 volts is suitable, and is commercially available.

It should be noted that each delay register must receive an 8-bit number in parallel. Accordingly, each register actually consists of eight shift registers operating in parallel in order to delay an 8-bit number in parallel. To minimize the cost of such delay registers. MOS (metal-oxide-silicon) integrated circuits may be used. More specifically, the shift registers may be of the MOS dynamic type commercially available because storage of digital information is not required; it is only necessary to transfer the information from input terminals through the delay register to output terminals.

After passing through a given delay register, the digital information is converted back to analog form by a digital-to-analog converter section 111. A separate digital-to-analog converter is provided for each channel in order that each value received in digital form for conversion into analog form is retained until a subsequent value in digital form is received from the delay register to which it is connected. This is because the information must subsequently be summed simultaneously. Multiplexing at the output of the delay registers would therefore be of little economic advantage, particularly since digital-to-analog converters are relatively inexpensive.

A multiplex trigger generator 112 produces a delayed trigger pulse for the analog-to-digital converter 105 to command conversion of analog data to digital form after the proper multiplexing switch has been activated. After a short period of time sufficient to permit the conversion, the clock drivers 102 generate two phase clock pulses $\phi 1$ and $\phi 2$ to enter the converted data into the appropriate delay register before another analog signal source is selected for conversion. A pulse further delayed by the trigger generator 112 commands a digital-to-analog conversion before the next multiplexing switch is selected by the control unit 107 to start another sampling cycle.

The statistically independent analog data from each of the sensor channels is presented to a summing amplifier 115 and then to a low-pass filter 116 which slows down the typical step functions inherent in digital-to-analog conversion. This low-pass filter has the same characteristics as one of the aliasing filters 104. The filtered output is then passed through an operational amplifier 117 which serves as a buffer between the decorrelator and the bank of thirteen ⅓ octave filters 20 shown in FIG. 1. It also serves as a convenient place for overall adjustment of the output (average) signal for calibration purposes while providing a low output impedance for optimum impedance matching with subsequent circuits.

From the foregoing brief description of the unit 18, it is evident that the multiplexer is employed solely for the purpose of using one analog-to-digital converter for all channels, i.e., is used simply as a commutator to cyclically place each channel into operation on a continuous time shared basis. This multiplexing technique is conventional and is widely used in analogous applications because it loosens the restrictions on the multiplex sample frequency imposed by the Nyquist criteria which relates minimum sampling frequency for a given acceptable aliasing error as $f_{max}=2f_0 n$, where fo equals the highest audio frequency which may be encountered by the system, and n equals the number of channels multiplexed. In the application of this multiplexing technique to the present invention, n equals 1 because each channel is completely independent and individually commutated. The minimum sampling rate permissible under such circumstances is therefore 4.56 KHz where fo in the foregoing equation is the corner frequency of the Chebyshev low-pass filter at the input of each channel. Since the individual sampling rate for each channel is 5.21 KHz, the Nyquist criteria is satisfied. In order to avoid problems inherent in multiplexing, it is evident that a separate analog-to-digital converter could be employed in each channel.

The analog output signal from the decorrelator and averaging unit 18 and the output signal of spectrum calibration generator 19 are both applied to a bank of thirteen ⅓ octave filters 20, but not at the same time, as will become evident. The filters divide the average signal from the unit 18 into equal frequency bands. Each band is then capable of being controlled independently in the gain control section 13. Since each band is thus statistically independent, the spectrum can readily be reconstructed subsequently by simple summation at the output of the gain control section.

Digital processing in the servo system controlling the gain of the section 13 is predicated on dc rather than ac input signals since the comparison made for each frequency band is between a static desired energy level and the actual energy level. Accordingly, although ac signals (narrow band random noise signals) are the functions being controlled, the actual analysis in the digital domain is carried out with varying dc equivalents of the random noise inputs. For this reason absolute value conversion of the narrow band noise to varying dc equivalents is necessary. The conversion is accomplished in a bank 21 of thirteen ac-to-dc converters, one individual converter for each ⅓ octave filter.

Narrow band noise from a given ⅓ octave filter enters an amplifier at the input of one of thirteen ac-to-dc converters 21 where additional amplification is provided prior to full wave rectification in the ac-to-dc converter. The varying dc output of each full wave rectifier is then filtered, thus completing the ac-to-dc conversion, and applied directly to one of thirteen multiplex switches 22. The multiplex switches commutate the dc signals under multiplex control to a single analog-to-digital converter 23 which is time shared with all thirteen ⅓ octave band channels to convert the varying dc signals into digital form for comparison with static values defining a desired spectrum of noise for the test object.

The purpose of the multiplex switches 22 is to sequentially connect the 13 narrow band analog-varrying (dc) signals to the analog-to-digital converter 23 to obtain digital values corresponding to the respective energy levels of the ⅓ octave bands. Each multiplex switch is preferably comprised of an MOS-type field-effect transistor having its source connected to an ac-to-dc converter and its drain connected to the single analog-to-digital converter. The gate of the transistor is connected to a multiplex control unit (not shown) which operates independently of the multiplex control unit of the decorrelator, although the same 1 MHz clock source may be shared for operating both multiplex control units. It is possible to connect each multiplex switch directly to the input of the analog-to-digital converter because of MOS-type field-effect transistor is almost a perfect switch, providing a very high impedance while the switch is turned off, and a low impedance while the switch is turned on.

In the operation, the multiplex control unit turns on the switches 22 in sequence, one every multiplexing cycle, each for a period of 11.5 milliseconds. Immediately upon turning on a new switch, the multiplex control unit generates an analog-to-digital conversion command pulse which resets the analog-to-digital converter 23 in order for a new conversion to take place. Full scale converstion requires a maximum of four microseconds. The convert command pulse need be no longer than 0.3 microseconds thus requiring only 4.3 microseconds for an analog-to-digital conversion, leaving the balance of 11.5 microseconds for processing the data.

The sequence of events for a particular multiplex time frame is as follows. At the instant a field-effect transistor gate is closed, the leading edge of the analog-to-digital conversion command pulse clears old information from internal registers of the time-shared analog-to-digital converter, while the trailing edge initiates a new conversion of the analog information present at the output of the selected multiplex switch which has by that time been turned on. Four microseconds after the trailing edge of the conversion command pulse, the new digital information for a particular ⅓ octave band is ready for processing.

The analog-to-digital converter is of the successive approximation type which assures that the conversion is complete after a fixed number of clock pulses depending upon the number of binary digits in the number to which the analog signal is being converted. A converstion to an 8-bit number provides adequate accuracy for the acoustic test tolerances usually encountered in test specifications. A larger number of binary digits in the converter output would permit much closer tolerance to be specified but would also increase the size of the converter and greatly increase the size of the data processing circuits which will now be described.

Since the analog-to-digital converter 23 is required to drive thirteen multiplex data processing channels, additional drive capabilities must be provided for the converter. A simple bank of buffer drivers 24 is provided for that purpose, one buffer driver for each output bit of the converter. Each buffer driver consists of an input inverting stage which in turn drives a pair of additional inverting stages. The result is an increase in the load capability of the analog-to-digital converter.

The 8-bit parallel output of the buffer drivers 24 is applied to thirteen digital memory registers 25. Each register corresponds to one of the thirteen narrow energy bands into which one of thirteen test spectrum values may be entered from a console 26 (through appropriate set switches for the thirteen different chanels). These values stored in the registers 25 are then selected during test by a set point memory multiplex unit 27 which selects the output of a given memory register for comparison with a test value from the analog-to-digital converter via the buffer drivers 24 for the corresponding narrow energy band being sampled by the multiplex switches 22. Accordingly, it should be understood that the multiplex switches 22 are synchronized with the set point memory multiplex unit 27 such that as the thirteen lines into the multiplex switches 22 are sequentially connected to the analog-to-digital converter 23 for the thirteen new energy band channels. In that manner the corresponding set point values for the thirteen energy band channels are selected for comparison.

The 8-bit output of the buffer drivers 24 is also connected to inputs of the memory registers in order that the spectrum calibration generator 19 may be used to enter a desired sound spectrum in memory. That calibration generator includes thirteen sine-wave generators in the spectrum calibration generator, each of the thirteen sine-wave generators being centered at the midpoint of a corresponding narrow band filter. These sine-wave generators provide the necessary analog voltage reference levels which are to be converted into digital form and then stored in the memory registers 25 in order to calibrate the ac-to-dc converters 21, and to generate the desired reference spectrum to which the chamber spectrum is compared. A control signal from the console 26 to each of the memory registers 25 enable the console operator to designate whether the memory registers should enter data from the buffer drivers 24 or from the console 26.

In the process of entering test spectrum data from the console, the 8-bit data for each channel is entered directly from the console upon manually selecting the memory registers for the different channels. For entering test specification data into the memory registers in the calibration mode via the converters 21 and 23, the multiplex memory switches 22 connect the thirteen channels to the analog-to-digital converter 23 in sequence while the memory multiplex unit 27 selects the appropriate memory registers to receive the output of the analog-to-digital converter. A display unit (not shown) may be provided for each register, or a single display may be provided for displaying the content of a selected register, in order to check the proper entry of test spectrum data from the console, and to read the data entered through the buffered drivers during calibration.

In some random noise excitation tests, it may be desirable to program changes in the desired spectrum without interrupting the test. That may be readily accomplished by interfacing the control console 26 with a programming unit, such as a stored-program, digital computer which will operate the control console to enter new test data as required. For example, to simulate random noise excitation for a component to be used aboard a spacecraft, it may be desirable to program changes in the noise spectrum in a sequence which would simulate the starting up and launching of the spacecraft.

After calibration and entry of a desired spectrum, the memory registers are continuously interrogated during system operation for comparison with the acoustic chamber spectrum. Lack of correspondence causes the gain of the control section 13 to be adjusted in which ever direction is necessary to bring the actual noise spectrum in the acoustic chamber to conform with the desired spectrum. Digital comparison is effected by an equality detector 28 and a relative magnitude detector 29.

The equality detector 28 determines whether the value (A) for one of the thirteen narrow band channels is equal to a set point (B) selected from a memory register 25, by effectively making a parity check on a bit-by-bit basis. If any bit in the value A is not equal to any bit in the value B, the equality detector transmits a signal indicating that A is not equal to B.

Such an equality detector may be comprised of logic gates for each bit position of the binary numbers A and B, where the logic gates perform the "exclusive or" function. That function provides a true output signal if either a binary digit of the value A or the corresponding binary digit of the value B is true, but not both. The expression for the "exclusive or" function may be written as $A\bar{B} + \bar{A}B$. If both A and B are true, the output is false, and if both A and B are false the output is false, but if A or B is true, but not both, the output will be true thus indicating by a true output signal that A is not equal to B. The A and B referred to is a given bit of a value A being compared with a corresponding bit of a value B. For an 8-bit value being compared a total of eight "exclusive or" circuits are used, one for each of the eight bit positions of the two values being compared.

The output signal from each of the eight "exclusive or" circuits may be combined through an OR gate so that if any one of the "exclusive or" circuits produces a true output signal, the OR gate will transmit a true output signal as the output of the equality detector. However, as will be more fully described with reference to FIG. 3, the preferred embodiment does not employ such an OR gate, and the "exclusive or" circuits are implemented with an inverting output stage thus producing a signal representing the Boolean function $\overline{AB + \overline{A}B}$, which indicates A equals B.

The output of the equality detector 28 is employed to enable the relative magnitude dectector 29 to perform its function. The relative magnitude detector searches for an inequality between binary digits of the values A and B starting with the most significant bit position, and when an inequality is found, it determines which of the two binary digits is greater. If the binary digit being compared with the value A is true while that from the value B is false, it is known that A is greater than B. A search through binary digits of less significance is then unnecessary because they cannot have any effect on the conclusion that A is greater than B. Similarly, if it is determined that the bit being compared from the value B is true, it is known that B is greater than A.

The relative magnitude detector may be implemented in many different ways, but since the relative magnitude comparison is done on a bit-by-bit basis, starting with the most significant bit, "exclusive or" circuits may be used as in the equality detector. That being the case, it is preferable to combine the logic of the equality detector with the logic of the relative magnitude detector in such a way as to effectively share the "exclusive or" circuits. A logic diagram for such a combined equality and relative magnitude detector is shown in FIG. 3 for values A and B having three bits.

Figure 3:
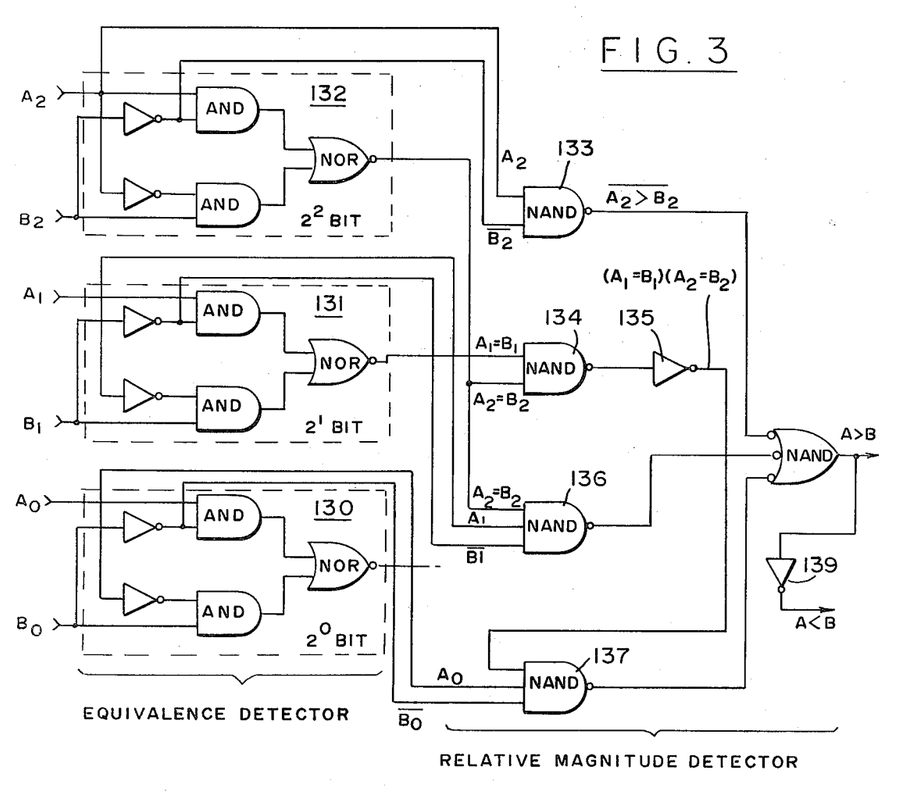
FIG. 3 illustrates a preferred embodiment for a relative magnitude detector combined with an equivalence detector, and operated synchronously in the arrangement of FIG. 1.

The arrangement of FIG. 3 may be readily expanded to eight or more bit positions by direct analogy. The equivalence detector portion is implemented as described hereinbefore using "exclusive or" circuits with an inverting output stage for forming the function in a given bit position $n$ of $\overline{A_n B_n + \overline{A}_n B_n}$, which is the same as determining the statement $A_n = B_n$ is true. That is accomplished by using a NOR gate as the output stage of the "exclusive or" circuit, instead of an OR gate. The effect of that NOR gate is to invert the normal "exclusive or" function and thereby provide a true output signal only when the two binary digits being compared are equal. These signals are then used directly in the relative magnitude detector for determining whether the value A is greater than or less than the value B.

The entire operation for equality and relative magnitude detection will be explained using as the example the value A = 101 and B = 110. The three equality detector sections 130, 131 and 132 determine whether the bits being compared in the respective bit positions $2^0$, $2^1$ and $2^2$ are equal. In the example, the bits $A_2$ and $B_2$ are equal; therefore, the section 132 transmits a signal indicating that $A_2$ is equal to $B_2$. The $A_2$ signal from the section 132 is connected to a NAND gate 133 while the signal $\overline{B}_2$ from the section 132 is connected to the second input terminal of the NAND gate 133. Since both $A_2$ and $B_2$ are equal to 1 in the example, $A_2$ is true while $\overline{B}_2$ is not. Accordingly, the output terminal of the NAND gate 133 is true indicating that $A_2$ is not greater than $A_2$. If $A_2$ and $B_2$ had both been 0, the result would have still been the same. A third possibility would have been for $B_2$ to be equal to 1 and $A_2$ to be equal to 0, but the output of the NAND gate 133 would have still been true since the statement that $A_2$ is not greater than $B_2$ would still be valid. The output of the NAND gate 133 is false only when $A_2$ is equal to 1 and $B_2$ is equal to 0.

Continuing with the example of A = 101 and B = 110, the bits $A_1$ and $B_1$ are unequal so that the output of a section 131 is not true, thereby indicating that $A_1$ is not equal to $B_1$. Therefore, a NAND gate 134 transmits a true signal which is inverted by an inverting gate 135. A NAND gate 136 receives a true signal from the circuit 132 in this example indicating that $A_2$ equals $B_2$, but both of the signals $A_1$ and $\overline{B}_1$ are false (0). Consequently the NAND gate 136 is disabled, and its output is true (1). In the less significant bit position, the signals $A_0$ and $\overline{B}_0$ to a NAND gate 137 are both true, but the gate output is still true because of the false output of the inverter 135. That is because the output of a NAND gate is high (true) if any one of its inputs is low (false). Under these conditions a NAND gate 136 has all inputs high, and its output will be low, thereby indicating that the value A is not greater than the value B. An inverter 139 provides a high output signal signifying that the value B is greater than the value A under these conditions.

If the value A is greater than the value B, such as when the value A is equal to 111 and the value B is equal to 110, then the NAND gate 138 will produce a true output signal. In that case, the respective outputs of the equivalence detector circuits 130, 131 and 132 will be low, high and high. Consequently, the NAND gate 134 will transmit a low signal, and the inverter 135 will provide a true signal at the third terminal of the NAND gate 137. The NAND gates 133 and 136 receive a low signal at respective terminals $\overline{B}_2$ and $\overline{B}_1$ so that the gate 136 transmits a high signal. The gate 137 receives a high signal at all three input terminals so that its output terminal is low. That makes the output of the NAND gate 138 high, indicating that the value A is greater than the value B.

To summarize the operation of the relative magnitude detection portion of FIG. 3, it searches for the first inequality, starting at the most significant bit position, and when found, disables the logic for the less significant bit positions. In the first example (A = 101, B = 110), the first inequality occurred at the second bit position examined ($A_1$, $B_1$,) to disable the NAND gate 137 with a low signal via NAND gate 134 and inverter 135. A low input signal forces the output of the NAND gate 137 true regardless of whether $A_0$ is greater than $B_0$, i.e., regardless of whether both $A_0$ and $\overline{B}_0$ are true. If the inequality had been detected at the most significant bit position, the circuit 132 would have disabled NAND gate 136 directly and NAND gate 137 via the NAND gate 134 and the inverter 135. The NAND gate 133 would then make the determination as to whether or not $A_2$ is greater than $B_2$.

If the value A is greater than the value B, none of the lower order NAND gates is disabled and each will make its own determination as to whether or not the value A is greater than the value B. That determination will in each case be made in the negative, thereby inferring that the value B is greater than the value A, thus driving the output of the inverter 139 high. The condition of A = B is thus interpreted as B>A. This does not affect the operation of the feedback control loop because it is desirable for the servo system to hunt about some desired level in any given narrow energy band. This is particularly true in this application of generating random noise because any effort to lock onto the statistical variations of the noise would be futile and meaningless. However, if for any reason the A = B condition were needed, it would be a simple matter to take a signal representing that condition directly, and to use it to inhibit any change in the feedback signal as long as that condition continues.

To expand the relative magnitude detector portion of the circuits of FIG. 3, additional gates analogous to the NAND gate 134 would be provided, and the output of each would be fed through an inverter to the logic for lower orders. Each such NAND gate might be called an "equals thus far" gate. For a relative magnitude determination to be made for a given order, such as for the least significant order shown in FIG. 3, the gate making the determination must receive an "equals thus far" signal. Accordingly, for an 8-bit detector, there must be six "equals thus far" gates, not seven because the gates for the relative magnitude section for the next lower order from the most significant bit receives an "equal thus far" signal directly as does the gate 136 in the 3-bit detector illustrated, and the logic for the most significant bit position itself obviously does not require an "equals thus far" signal. In addition to the foregoing, it is evident that an expanded portion for the relative magnitude detector would include an expanded output NAND gate 138 to receive one relative magnitude determination signal from each logic level or order, i.e., from logic for comparing corresponding bit positions of the values A and B.

Although a particular embodiment for a relative magnitude detector has been disclosed, it should be understood that any other detector providing the same function may be employed in conjunction with an equivalence detector implemented with "exclusive or" circuits, as noted hereinbefore. MOS field-effect transistor circuits are commercially available for relative magnitude detection.

The resulting signals from the relative magnitude detector 29 are employed as up and down control signals for an up-down counter 30. If the relative magnitude determination is that the value A is less than the value B, the signal at the output of the NAND gate 138 is high indicating A>B to control the up-down counter to count up one unit, thereby increasing the gain of the gain control section 13 for the particular channel being selected by the multiplexing unit for the values A and B compared. Similarly, if the value B (the stored spectrum value) is less than the value A, the up-down counter is controlled to count down one unit, thereby decreasing the gain in the gain control section for that particular narrow band channel.

Since the relative magnitude detector actuates the counter 30, the counter can respond in only those instances when the spectrum value being compared is greater than or less than the desired spectrum values. However, as just noted, the condition A = B is interpreted to be B>A. If the condition A = B is to control the counter so that it does not count up or down, the relative magnitude detector 29 should be implemented in such a way as to transmit a count-up or count-down control signal only while the value A is determined by the equality detector 28 to be not equal to the value B, but as just noted hereinbefore, it would be futile and meaningless to attempt to achieve such an equality condition. Accordingly, in the preferred embodiment of the relative magnitude detector 29, there will always be a down control signal being transmitted to the counter 30 except when it is determined that the value A is less than the value B. That design therefore allows desirable hunting to take place. However, even in this preferred embodiment, it would be desirable for the test control operator to be able to lock the control system on the desired test spectrum values when the spectrum of the noise energy in the acoustic chamber has converged on the desired spectrum. This lock-on control could be accomplished by connecting a spectrum analyzer of any type commercially available at the output of the decorrelator and averaging unit 18. Upon observing the desired convergence through such an analyzer, the operator could disable both the up and the down control terminals of the counter 30 through the console. By continuing to observe the spectrum of the acoustic energy in the chamber, the operator could allow the tests to continue with fixed gain in the control section 13 for the period of time required by the test specification. Should the spectrum of the noise energy in the chamber then start to divert from the desired spectrum, the operator could restore the feedback control by simply enabling the up and down control terminals of the counter 30 again.

The up-down counter 30 supplies an 8-bit count for gain control of individual narrow band channels within the multiplexing framework of the switches 22 and 27, equality detector 28, and relative magnitude detector 29. An 8-bit count provides a total of 256 levels of gain control in a given channel. Once the gain for a given channel has been updated through the counter 30, the content of the counter specifying the gain for the given channel is transferred through buffer drivers 31 to a hold register 32 reserved for that channel. Accordingly, there are thirteen hold registers, a proper one being selected at any given time by the same multiplex framework.

The contents of the hold registers are transferred back to the up-down counter 30 in sequence through a feedback buffer 33 during the successive frames of each multiplexing cycle. During a given frame of a multiplexing cycle, the gain control for a given narrow band channel stored in a given register 32 is thus transferred back into the counter 30 for updating. Once updated, the gain control value is transferred back to the given register 32 before the multiplex control framework of the system advances to the next gain control register 32 in sequence for the next channel to be sampled and updated as to its gain control.

Figure 4:
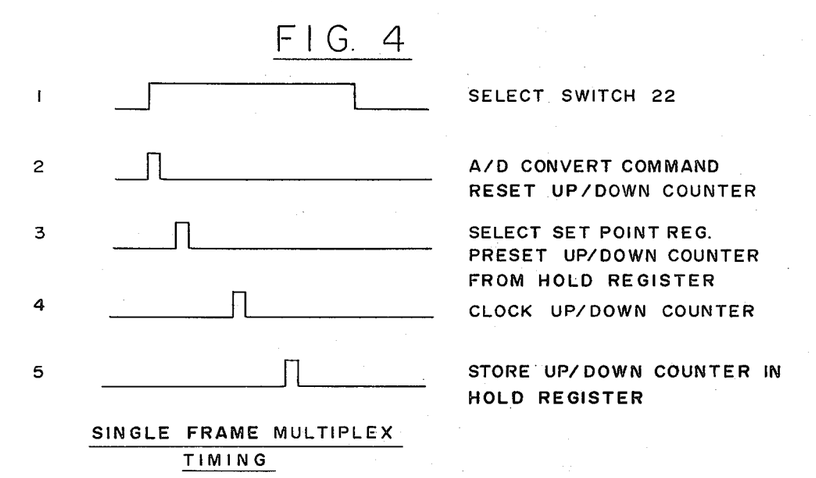
FIG. 4 is a timing diagram for one frame of the time multiplex sequence of control for the arrangement of FIG. 1.

FIG. 4 illustrates a timing diagram for this system multiplex framework during a given multiplex frame for a given narrow band channel. The time of each wave form is not shown to scale but simply to show the sequence of events. Briefly, waveform 1 selects a multiplex switch 22 for a given channel and waveform 2 initiates an analog-to-digital conversion for the channel selected. At approximately the same time, the counter 30 is reset to zero. Following that, the waveform 3 selects the set point for the given channel in memory, and presets the up-down counter 30 with the previous multiplexed content of the hold register 32 reserved for the given channel. By the time the set point has been selected in memory, the analog-to-digital conversion of a sample selected through the multiplex switch is complete for the equality and relative magnitude determination to be made, the latter not under multiplex control. Instead, both sections of the circuit shown in FIG. 3 are permitted to function continuously even though the values being compared are not correct until the proper set point value has been selected from memory, and the analog digital converter has completed its operation. The timing control is exercised by the fourth waveform which clocks the up-down counter 30 only after a sufficient period of time has elapsed for the equality detector 28 and the relative magnitude detector 29 to settle and yield the correct indication as to whether or not A is greater than B. Thereafter, the fifth waveform pulse clocks the appropriate hold register 32 to enter the updated gain control value in the counter 30.

Only one clock pulse is applied to the counter during each multiplexing frame, and therefore during each frame the counter is altered by only one unit out of a possible total of 256. Consequently, since each frame represents control of only one narrow band channel, change of the energy spectrum in the acoustic chamber 16 is relatively slow. Since the change in the level of the acoustic chamber is determined by the clock rate for the multiplexing framework, control of the clock rate yields control over the time required to converge on the desired test spectrum.

The up-down counter 30 may, in practice, be implemented in a number of different ways, but it is preferred that it be implemented as a synchronous 8-bit counter having two separate control networks, one to enable it to count up by one unit in response to each clock pulse applied, and another to enable it to count down by one unit in response to each clock pulse applied, the direction of counting depending upon which of two control terminals is high, namely whether the up control terminal or the down control terminal is high in response to the output of the relative magnitude detector 29.

The separate logic networks for counting up and down will respond to the clock pulse shown in waveform 4 of FIG. 4 during each frame of every multiplexing cycle, except when either a count of 256 is reached, or a count of 0 is reached in binary form. In either case, the counter has been driven to the limits of control that can be effected for the gain control section 13 through the counter. Otherwise, if a count of 256 has been reached, one more clock pulse will recycle the counter to 0, thereby causing a step function in the gain control from one limit to the other. The same problem is presented if a count of 0 has been reached and a clock pulse were to be allowed to cause the counter to count down. Accordingly, the counter is inhibited from counting up past 256, or down past 0. To accomplish that the count 256 is detected and the output is employed to inhibit the clock pulse from actuating the count-up logic. Similarly, the count of 0 is detected and employed to inhibit the clock pulse from actuating the count down logic. This is especially useful when chamber harmonics are being detected.

In addition to the count-up and count-down logic network, the counter 30 includes a network for presetting the counter to the content of a given hold register during a particular frame of the multiplexing cycle. That is easily accomplished by implementing the counter with, for example, JK flip flops having the J and K terminals controlled by the up and down logic networks, each JK flip flop having a separate set control terminal and a separate reset control terminal. The pulse of waveform 2 in FIG. 4 is applied to the reset control terminals to reset all of the counters to 0, thereby effectively erasing the content of the counter left over from the preceding frame of the multiplexing cycle. The next pulse in waveform 3 of FIG. 4 is then gated to each set control terminal of the eight flip-flops in the counter into which a binary 1 is to be entered in order to transfer the contents of a hold register 32. That can be accomplished by an AND gate for each flip flop enabled by a binary 1 from a corresponding flip flop in a hold register. Which hold register is to be permitted to enable appropriate ones of these preset control AND gates is controlled by the feedback buffer 33 which may be implemented with thirteen banks of eight AND gates only, one given bank being enabled during each frame of a multiplexing cycle, the bank being selectively enabled by the multiplexing framework to be the appropriate one for the channel being selected by the multiplexing switches 22. All of the thirteen banks of eight AND gates are then routed to the preset control AND gates of the counter via a bank of eight OR gates, each OR gate having 13 input terminals, one for the same stage of each of the hold registers.

The gain control section 13 contains thirteen digital-to-analog converters 34, one for each of the hold registers to convert the content of the hold register to which connected into a dc signal having an amplitude linearly proportional to the value of the number stored by the register in digital form. In practice, each digital-to-analog converter may be implemented by a conventional resistor ladder network. The output of each digital-to-analog converter is connected by an operational amplifier 35 to an analog multiplier 36. There the narrow band signal from each of thirteen ⅓ octave filters 11 is multiplied by the content of the appropriate one of the hold registers 32. In that manner, the gain of each of thirteen narrow band channels of noise from the generator 10 separated by the ⅓ octave filters 11 can be individually controlled in amplitude to produce any desired spectrum that may be specified by the set point entered in the memory registers 25. The separately controlled channels are then combined through a summing amplifier 37 to present to the electropneumatic transducer 15 the composite of the 13 narrow band signals, the amplitude of which is directly controlled by the analog multipliers. Accordingly, it is evident that each analog multiplier is in effect a narrow band amplifier with variable gain.

The multiplexing framework for the system may be implemented in a manner analogous to that described for the decorrelator and averaging unit 18 which, as noted hereinbefore, operates independently. Operating from the 1 MHz clock of that unit, the multiplexing system employs a 13-stage ring counter to establish the frames for each multiplexing cycle. Within each frame, a set of control pulses is generated for the proper sequence of events described hereinbefore.

Each frame signal is applied to a different one of the multiplex switches. It is a wide pulse of 11.5 milliseconds for a 350 Hz clock rate derived from the master clock of 1 MHz, or established independently by a separate oscillator. All other multiplex control signals are bounded by the pulse width of the frame signal. Each time a frame signal occurs, a multiplexing switch closes for 11.5 milliseconds permitting analog data from a particular AC to DC converter 21 to pass to the time shared analog-to-digital converter. When that frame signal goes low, the multiplexing switch opens, disconnecting the particular converter 21. Immediately another frame signal is generated to start the same control sequence for another narrow band channel. Each time, the identical frame signal that closes a particular multiplexing switch gates the contents of an appropriate set point memory register 25 to the equality detector and the relative magnitude detector 29.

Within each frame, an analog-to-digital command (2.5 $\mu$sec pulse) is generated immediately. The leading edge of that pulse resets the analog-to-digital converter 23 and the trailing edge initiates a conversion cycle which requires only 4 $\mu$ sec for an 8-bit successive approximation conversion. During this conversion interval, a pulse is generated to reset the up-down counter 30 as described with reference to FIG. 4 to clear it. The reset pulse may, in practice be derived directly from the digital-to-analog command pulse. A delayed pulse generated through a monostable multivibrator then generates a counter preset control pulse. The counter can then be clocked after sufficient time has been allowed for the relative magnitude detector to settle after the middle of each frame period. A master clock counter may be used to time the counter clock pulse from the beginning of a frame. That clock pulse is a 5 $\mu$ sec pulse, and preferably occurs half way between the analog-to-digital conversion command and the hold register enable command shown in waveform 5 of FIG. 4. That pulse allows the updated gain control value to be stored in the register from which the counter 30 was preset, thus completing a frame of a multiplex cycle. The specific manner in which the control pulses or signals are generated, distributed and used will depend upon the specific nature of the component circuits selected since different families of circuits have different requirements on pulse height, rise time, response time, etc. However, from the foregoing description of the organization and operation of the present invention, one skilled in the art may easily select component circuits and provide a suitable multiplex control unit.

Although a particular embodiment of the invention has been described and illustrated herein, it is recognized that modifications and variations may readily occur to those skilled in the art. Consequently, it is intended that the claims be interpreted to cover such modifications and variations.

What is claimed is:

1. A method for controlling the generation of random sound energy in a reverberant acoustic chamber for the purpose of testing an object with a predetermined noise spectrum using a noise generator to produce a random noise electrical signal and a plurality of filters to separate said random noise signal into a plurality of narrow frequency band drive signals, a plurality of separate gain control means, a separate gain control means for each band drive signal, means for combining the outputs of said separate gain control means into a composite drive signal, and electropneumatic sound generating means for producing sound energy in said chamber in response to said composite drive signal, comprised of the steps of employing a plurality of sensors in said chamber to produce electrical signals, each sensor signal having frequency components of amplitudes which depend upon the location of the sensor in said chamber, obtaining a composite response signal from said sensor signals as an average of all said sensor signals, separating said composite response signal into a plurality of narrow frequency band signals corresponding to said narrow frequency bands into which said generated noise is separated, periodically comparing the energy level in each narrow frequency band signal of said composite response signal with a separately specified energy level of said predetermined noise spectrum to determine whether said response energy level of each channel is greater or less than said desired energy level for each channel, and incrementally adjusting the gain of said plurality of separate gain control means by one unit to drive the spectrum of noise being generated toward convergence with said desired spectrum, a given gain control means being adjusted by one unit to increase gain if said response energy level of the narrow frequency band channel being controlled by said given gain control means is determined to be too low in the preceding step, and adjusted by one unit to decrease gain if said response energy level of the narrow frequency band channel being controlled by said given gain control is determined to be too high in the preceding step.

2. A method as defined in claim 1 wherein said step of obtaining a composite response signal from said sensor signals as an average of all said sensor signals is comprised of the steps of decorrelating said sensor signals by delaying different ones of said sensor signals by different time periods such that no two are coherent, adding the delayed signals and dividing the sum signal by a number proportional to the number of sensor signals being decorrelated and averaged.

3. A method as defined in claim 1 wherein a given gain control means is comprised of means for multiplying a narrow band drive signal derived from said random noise signal by a second signal, and said second signal is controlled in amplitude to control gain in the last step, said last step being carried out by counting up an increment of one unit each time gain is to be increased, and counting down an increment of one unit each time gain is to be decreased, and converting the resulting value of gain control thus produced in digital form into analog form for use as said second signal.

4. A method as defined in claim 3 wherein said step of periodically comparing separately specified energy levels with the energy levels in respective narrow frequency band signals derived from said composite response signal is carried out by storing in digital form the values of said separately specified energy levels, averaging the amplitude of each narrow frequency band signal by converting it from ac to dc form, periodically sampling said narrow frequency band signals thus converted to a dc form, converting the amplitude of each sample into digital form, and comparing each sample in digital form with a specified energy level value in digital form stored for the narrow frequency band signal from which the sample was obtained.

5. A method as defined in claim 4 wherein said step of periodically comparing separately specified energy levels with the energy levels in respective narrow frequency band signals is so carried out that equality is interpreted to mean that a predetermined one of two values compared is greater, thereby causing the resulting gain control to continually seek a condition producing equivalence and not lock on a condition producing equivalence.

6. In apparatus for controlling the generation of random sound energy in a reverberant acoustic chamber for the purpose of testing an object with a predetermined noise spectrum, the combination of, means for generating a noise signal, filtering means for separating said noise signal into a plurality of narrow frequency band drive signals, summing means for adding signals to provide a composite signal, a plurality of voltage variable gain control means for coupling said drive signals to said summing means, an electropneumatic sound generating means responsive to said composite signal for producing sound energy in said chamber, said sound energy thus having a spectrum according to said noise signal as modified by said voltage variable gain control means, a plurality of sensor means in said chamber for producing electrical signals, each having frequency components of amplitudes which depend upon the location in said chamber of the sensing means producing it, means for producing a composite response signal from said sensor signals as an average of all said sensor signals, filtering means for separating said composite response signal into a plurality of narrow frequency band signals corresponding to said narrow frequency bands into which said generated noise is separated, means for storing desired values of energy levels of said predetermined noise spectrum, one value for each narrow frequency band into which said composite response signal is separated, means for periodically comparing said stored values of desired energy with energy levels of corresponding narrow frequency band signals, and means for producing a different gain control voltage for each gain control means, said gain control voltage means adjusting the voltage of a given voltage variable gain control means by one unit during each energy level comparison to drive the spectrum of noise being generated toward convergence with said predetermined noise spectrum.

7. Apparatus as defined in claim 6 wherein said means for producing a composite response signal from said sensor signals as an average of all said sensor signals is comprised of means for delaying different ones of said sensor signals for different time periods, and means for adding said sensor signals after passing through said delay means.

8. Apparatus as defined in claim 6 wherein said means for producing a different gain control voltage for each gain control means is comprised of means for counting up an increment of one unit each time gain is to be increased, and counting down an increment of one unit each time gain is to be decreased, and means for converting the resulting value of gain control thus produced in digital form to analog form for use as said gain control voltage.

9. Apparatus as defined in claim 8 wherein said desired values of energy levels of said predetermined noise spectrum are stored in digital form and said comparing means includes means for converting each narrow frequency band signal to a dc signal proportional to the energy thereof,
means for periodically sampling the energy of each of said narrow frequency band signals thus converted to dc form,
means for converting the amplitude of each energy sample into digital form, and
means for comparing each energy sample in digital form with a desired energy level stored in digital form for the narrow frequency band signal from which the energy sample was obtained.

10. Apparatus as defined in claim 9 wherein said means for comparing each sample in digital form with a desired energy level in digital form includes means for interpreting a condition of equality to be one of inequality with a predetermined one of two values being compared greater, thereby causing the resulting gain control to continually seek a condition producing equivalence and not lock on a condition producing equivalence.

* * * * *